July 26, 1932.   F. B. WATSON ET AL   1,868,863
METHOD OF MANUFACTURING BIFOCAL LENSES
Original Filed Feb. 26, 1927
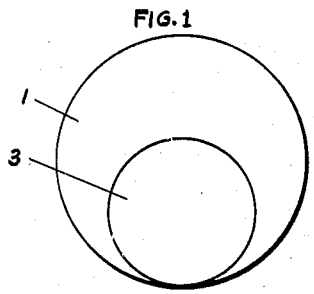
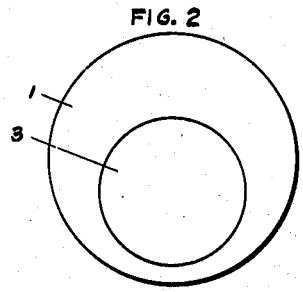
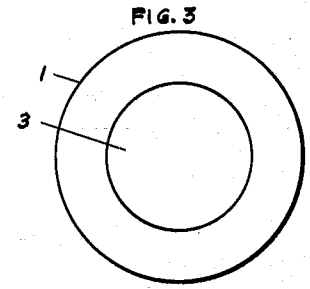
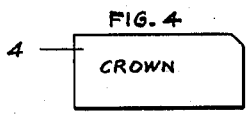
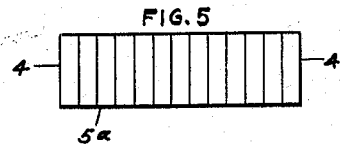
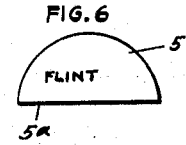
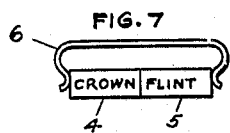
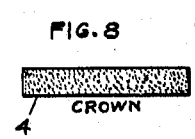
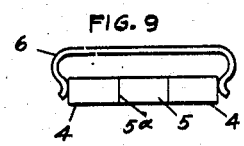
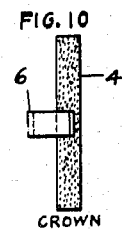
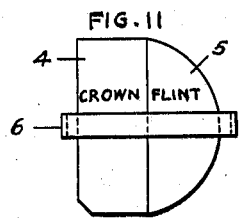
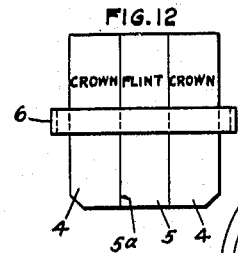
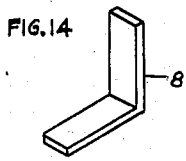
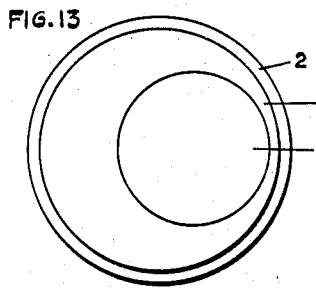
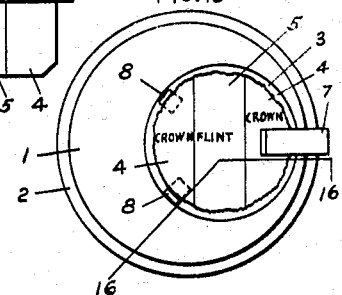
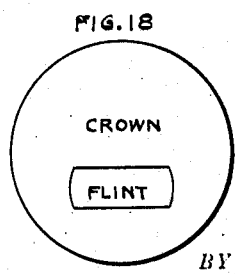
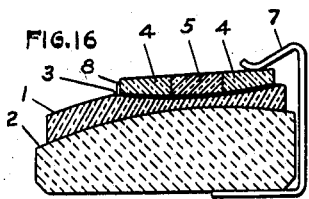
INVENTORS
FRANK B. WATSON.
EDWARD CULVER.
BY
ATTORNEYS Patented July 26, 1932

1,868,863

UNITED STATES PATENT OFFICE

FRANK B. WATSON AND EDWARD CULVER, OF LONDON, ENGLAND, ASSIGNORS TO UNITED KINGDOM OPTICAL COMPANY, LIMITED, OF LONDON, ENGLAND

METHOD OF MANUFACTURING BIFOCAL LENSES

Original application filed February 26, 1927, Serial No. 171,217. Divided and this application filed August 28, 1929. Serial No. 388,911.

Our invention relates to a method of manufacturing fused bifocal lenses.

It is the object of our invention to provide a method of fusing bifocal lenses so that the fused inserts may be positioned at varying positions relative to the main lens or countersink notwithstanding the variation in form and size of the insert with respect to the countersunk portion of the main lens.

It is a further object to provide a method of manufacturing such lenses so that they will be accurately positioned initially when the fusing starts, and will be automatically maintained in the accurate position desired during the fusing, so that the resulting lens will be accurately formed.

It is a further object to provide such steps in our method that the resulting lenses will be homogeneous, and mechanically and optically perfect, despite the fact that they are produced in quantities.

This application is a division of application Serial No. 171,217, filed February 26, 1927.

Referring to the drawing:

Figure 1 is a plan view of a countersink with the circular depression for receiving the button located near the margin of the countersink;

Figure 2 is a similar view with the depression located nearer the center of the countersink;

Figure 3 is a view showing the countersink depression and the countersink itself geometrically centered;

Figure 4 is a plan view of one of the inserts constituting a portion of the button, such as the crown insert;

Figure 5 is a side elevation of a group of flint sections joined together for uniform polishing and finishing on the edges thereof;

Figure 6 is a semi-circular section of one of the flint button sections;

Figure 7 is a side elevation of a pair of button sections held together by a clip for fusing;

Figure 8 is one side of one of such sections showing the gray edge thereof on the crown portion;

Figure 9 is an end elevation of a series of sections constituting the button being held in position for fusing, the center section being flint and the side sections being crown on the sides of the flint section of the button;

Figure 10 is a side elevation thereof showing the gray edge of the crown sections;

Figure 11 is a plan view of Figure 7;

Figure 12 is a plan view of Figure 9;

Figure 13 is a view of the countersink mounted on a carborundum slab;

Figure 14 is an enlarged side elevation of a feeler;

Figure 15 is a plan view of the carborundum base, countersink, button, clip and feelers in position;

Figure 16 is a section on the line 16—16 of Figure 15;

Figure 17 is a side elevation of the carborundum slab used for fusing the segments to one another, with a clipped assemblage of button segments thereon;

Figure 18 is a plan view of the completed lens.

Referring to the details of our method, we prepare molded blanks of crown glass 1, preferably of index 1.5232, ground and smoothed in order to fit carborundum slabs 2.

We then grind the countersink to the circular depression 3 in any one of the locations shown in Figures 1, 2 and 3 depending upon the position of the insert as desired in the finished lens.

In locating these depressions, we keep in mind that we desire the finished product to have a single geometrical optical center for both distance and reading portions as near as may be possible, although this is not essential because many of our lenses are not so arranged.

One of the fundamentals of our invention is to provide these countersink portions with a polish very much finer and more accurate, absolutely free from any pitting.

Heretofore, a good felt polish finish has been sufficient, but we find it necessary to use a material consisting of fiber, pitch and wax so as to insure the depressions being absolutely free from holes or what is known as curdly surface, thereby eliminating any variation which might make the fusing imperfect.

We then take the segments, which constitute the button, the exact proportion of which is hereinafter explained, and assemble these segments either in combinations of one semicircular flint segment 5 and one oblong crown segment 4, or two oblong crown segments and one oblong flint segment.

We prefer to have the edges of the crown segment unpolished or gray, as indicated at 4a in Figure 8, or Figure 10.

As to the flint sections 5, one edge 5a is then ground plano and finished until it is a constant free from any small pits. It is desirable to have this finished with this uniform surface, but not highly polished so as to avoid any light reflections which would result from high polishing, i. e. it is given a semipolish where it meets the crown segments.

The flint portion of the segment should be an extra dense flint with an index of 1.6495 to 1.652, and of proved expansion qualities. These flint portions of the glass are cut into oblong slabs 5. The sides are smoothed plano and they may be assembled into groups side to side, as in Figure 5, by means of the Swedish pitch. A good wax may be used. The top and bottom edges are then ground and reduced to approximately 9¼ millimeters with both sides parallel and smoothed finely, so that there are no pits.

They are then lightly polished with a pitch polish which keeps them free from aberration and which does not form small pits as with the ordinary felt polish.

They are then cleaned with a solvent and dried with a cloth of such a character that it does not leave any lint or threads on the surface.

We join the edges of these segments by holding them together in a clip 6 and fusing them together. This fused button shown in either Figures 11, 12, or 15, consisting of a portion of crown glass and a portion of flint glass is located in the depression 3 of the countersink 1 which is mounted on the carborundum base 2. It is held in position by a clip 7, which engages the top of the button and the bottom of the carborundum slab.

In order to position the button in the countersink, we provide angled feelers 8, one portion of which is below the button and the other portion of which is against the edge, which feelers serve to hold the button in position and completely melt into the lens without injuring it through the fusing process, and thereby provide means of positioning the lens and compensating for the conditions which occur through fusing, so that the insert will not be displaced. This zinc feeler is later removed by grinding.

We find that, due to holding the buttons in position by means of the spring clips with very slight pressure that this has a slight tendency to raise one end or side of the segment from the countersink with the ultimate result of imperfect fusing caused with imperfect contact unless feelers are used.

These feelers, when placed in proper positions in the countersunk portion of the main lens, hold the flint insert away from the countersink, permitting it to drop evenly for perfect fusing. These feelers are sheet zinc and will melt before the fusing temperature is high enough for this flint insert to drop.

The combination as shown in Figures 15 and 16 is then inserted in the furnace, preferably in an electric furnace, and the temperature raised to about 700 degrees centigrade and kept at that temperature for about fifteen minutes.

The furnace is then allowed to cool about fifty degrees in the next thirty minutes, whereupon the current is shut off and the lenses cool in the closed furnace gradually for a period of about fifteen hours.

It will be understood that the crown portions of the buttons are of the same refractive index and expansion as the countersink or distance portion. They are also preferably of the same material as the countersink in order that there shall not be the slightest dispersion or variation in the lenses as a finished product because the crown portions must be fused homogeneously.

The clips used in all fusing operations are made of Monel metal or other similar noncorrosive material.

Care must be taken to prevent any dust between contact surfaces as this will result in air bubbles.

The segments are now shanked or chipped to circles as large as possible and one side is brightened plano. They are turned then to the other side where the contact curve is ground as desired.

Great care must be exercised in not having the slightest rounding or aberration at the dividing lines which would render the combination useless for fusing to the countersink.

In order that the accuracy of the fit between the button and countersink may be understood, it is desirable and essential that the segment must be nearly the same by color contact, which is a most exacting method of testing curvatures.

In preparing the segments, it is desirable to leave one edge, that is the outer edge, quite rough so that it may be readily distinguished from the contact side which engages with the other portion of the segment.

This refers to the crown portions of the segments.

It will be understood that the construction shown in Figures 7 and 9 and Figures 11 and 12, when assembled, are placed in the furnace which is raised to 620 degrees centigrade and kept there at that temperature for about 15 minutes before being allowed to slowly cool.

During the heating, they are mounted on carborundum slabs which are dusted with powdered mica to prevent the soft glass from sticking.

It is after this time that the resulting button has imparted to it the curvature of the button shown in Figure 15. The side on which the mica has been placed should be brightened plano and fairly well polished, but no special care is necessary as to the holes or rounding.

The other side is then worked to the proper curvature to fit in the countersink.

When the fusing takes place, the button sections drop together as a unit so as to fit perfectly in the depression; the crown portions of the button fuse into the crown countersink and the whole becomes an internal unit there being a visible, but not optically objectionable line of division between the flint segment and the crown countersink. Obviously after the fusions, the outer edges of the flint portions may be chipped to conform roughly to the configurations of the desired button.

It will be understood that we desire to comprehend within our invention such modification as may be necessary to adapt it to varying conditions and uses.

Having thus fully described our invention, what we claim as new and desire to secure by Letters Patent, is:

1. In a process of forming a button, joining flint and crown portions to one another, holding them in engagement with one another, mounting them on a carborundum slab covered with mica, fusing in a furnace at 620 degrees centigrade for fifteen minutes, allowing to cool in the furnace for fifteen hours, removing from the furnace, cutting the margins of the button to the desired configuration and finishing the sides thereof.

2. The method of making bifocal lenses which consists in countersinking a crown-glass major-lens element, forming a button for the minor-lens element by fusing together edge to edge a flint-glass segment and a crown-glass segment of like index with that of the major-lens element, finishing the button on one side to fit the countersink with optical accuracy, supporting said button on said major element at the outer edge of said cavity by contact of said button segment of like index with said major element, the remainder of said button being held separated from said major element by zinc feelers, mounting said assemblage of elements on a carborundum support dusted with powdered mica or other non-adhesive insulation, heating the whole in a furnace for about fifteen minutes at about 700 degrees centigrade, reducing the heat to about 650 degrees for about thirty minutes, and letting the lenses cool and season in the furnace for about fifteen hours.

3. The method of making bifocal lenses which consists in forming a countersink in a major lens, forming a button and placing it in the countersink on the major lens, mounting said assemblage on a carborundum support dusted with powdered mica, heating the whole in a furnace for about fifteen minutes at about seven hundred degrees C., reducing the heat to about six hundred and fifty degrees for about thirty minutes, and letting the lens cool and season in the furnace for about fifteen hours.

In testimony whereof we affix our signatures.

FRANK B. WATSON.
EDWARD CULVER.